Nov. 9, 1926.  
W. A. SHORT  
STALK CUTTER  
Filed Feb. 26, 1925  
1,606,324
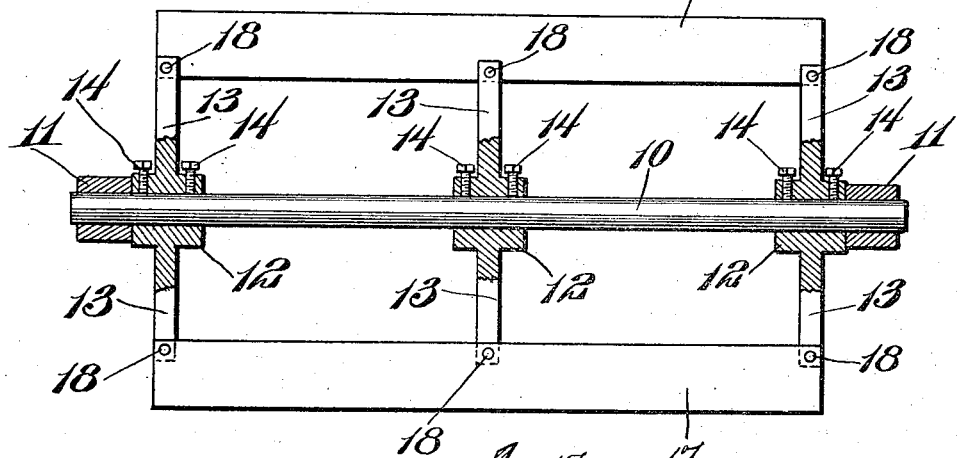
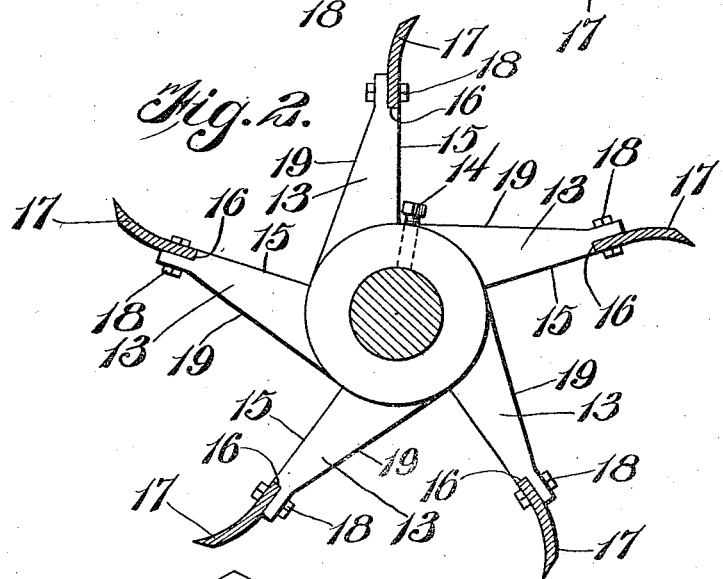
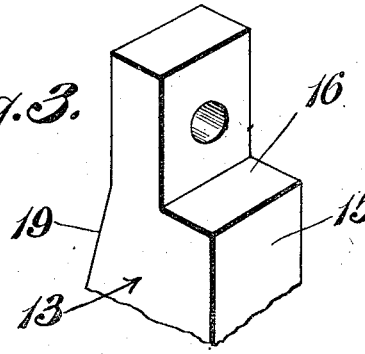
Inventor  
W. A. Short  
By Watson E. Coleman  
Attorney Patented Nov. 9, 1926.

1,606,324

UNITED STATES PATENT OFFICE.

WILLIAM A. SHORT, OF ROCHESTER, TEXAS.

STALK CUTTER.

Application filed February 26, 1925. Serial No. 11,793.

This invention relates to stalk cutters and more particularly to the construction of the cutting reel thereof.

An important object of the invention is the provision of a novel and improved spider construction for use in the construction of the cutting reel, the spider being so formed that the blade is rigidly reinforced and is presented at the proper angle to accomplish the best results in cutting.

A further object of the invention is to provide a spider of such construction that it is readily possible to construct a reel of the desired length whether this length be for a one row cutter or a two or three row cutter.

A further object of the invention is to provide a reel in which the hubs of the end spiders act to maintain the reel against longitudinal movement.

These and other objects I attain by the construction shown in the accompanying drawings, wherein for the purpose of illustration is shown a preferred embodiment of my invention and wherein:—

Figure 1 is a vertical sectional view through a reel employing spiders constructed in accordance with my invention;

Figure 2 is a side elevation of one of the spiders; and

Figure 3 is an enlarged perspective view of the outer end of one of the arms.

Referring now more particularly to the drawings, the numeral 10 indicates a reel shaft and 11 spaced bearings for the reel shaft and between which the reel is to be mounted. In accordance with my invention, I mount upon the reel shaft a plurality of spiders identical in construction and each comprising a hub 12 and a plurality of arms 13 radiating from this hub.

The hubs 12 are of a greater width than the arms 13 so that they project upon opposite sides thereof and each have directed therethrough at opposite sides of the arms set screws 14 by means of which the hub may be secured against rotation with relation to the shaft 10. The hubs 12 of outermost spiders will be arranged to engage against adjacent faces of the bearings 11 so that the shaft and reel carried thereby are held against longitudinal movement.

The arms 13 are each formed with forward faces 15 on a line radial to the axis of the hub and each formed at the outer end thereof with a recess of a depth equal to the width of the cutter blade to be employed and forming upon the arm a shoulder 16 at right angles to the axis of the hub against which the inner edge of the cutter blade 17 rests. Through the cutter blade and the outer end of the arm, bolts 18 are directed for securing the cutter blade in position upon the arms, the cutter blade preferably made of such length that its ends do not project beyond the arms of the outermost spiders so that they will not interfere with supports for the bearings 11. The rear face 19 of each arm extends to the base or inner end of the forward face of the next adjacent arm. It will be understood that in referring to forward and rear faces of the arms, reference is had to the direction of rotation and that the forward face is that face which is arranged in advance as the cutter rotates.

It will be seen that by the use of a device constructed in accordance with the foregoing description, a reel of desired length can be produced by simply employing a desired number of spiders and that the blade will be rigidly supported throughout its length. The construction of the arms places the cutting thrust of these blades against the axis of the spiders and accordingly applies it as nearly as possible to the entire surface of the shaft, thus preventing any tendency to twisting of the spiders about the shaft and removing strain from the fastening of the cutters.

I claim:—

In a stalk cutter, a reel comprising a shaft, a plurality of spiders mounted upon the shaft, blades connecting the outer ends of the arms of the spiders and having their ends coincident with the outer faces of the outermost spiders, said spiders each having a hub projecting outwardly at opposite sides of the arms thereof and securing elements directed through the hub at opposite sides of the arms for engagement with the shaft, the forward faces of said arms being radial to the axis of the shaft and each having formed in the outer end thereof a notch of a depth equal to the width of the blade to be supported, the extremity of the arm having an opening therethrough for the passage of a securing element for retaining the blade in position against the shoulder, the rear face of the arm extending to and joining the base of the next succeeding arm.

In testimony whereof I hereunto affix my signature.

WILLIAM A. SHORT.